United States Patent [19]

Stockton

[11] 4,430,908
[45] Feb. 14, 1984

[54] SPLIT PATH ELECTRIC VEHICLE POWERTRAIN

[75] Inventor: Thomas R. Stockton, Ann Arbor, Mich.

[73] Assignee: Ford Motor Company, Dearborn, Mich.

[21] Appl. No.: 299,906

[22] Filed: Sep. 8, 1981

[51] Int. Cl.³ .................. F16H 47/08; F16H 37/08; F16H 57/10

[52] U.S. Cl. .................. 74/688; 74/695; 74/760; 74/758

[58] Field of Search .................. 74/681, 688, 695, 701, 74/760, 761, 677

[56] References Cited

U.S. PATENT DOCUMENTS

| | | | |
|---|---|---|---|
| 2,911,853 | 11/1959 | Sand | 74/761 |
| 3,024,668 | 3/1962 | Kronogard et al. | 74/761 |
| 3,088,339 | 5/1963 | Black | 74/760 X |
| 3,106,107 | 10/1963 | Hardy | 74/758 X |
| 3,143,898 | 9/1964 | Everden | 74/688 |
| 3,250,150 | 5/1966 | Stockton | 74/688 |
| 3,255,643 | 6/1966 | Hause | 74/695 |
| 3,770,074 | 11/1973 | Sherman | 74/674 X |
| 3,986,413 | 10/1976 | Stockton | 74/688 |
| 4,282,773 | 9/1981 | Ohtsuka | 74/688 |
| 4,368,649 | 1/1983 | Vahratian et al. | 74/695 |

FOREIGN PATENT DOCUMENTS

| | | | |
|---|---|---|---|
| 2362840 | 7/1974 | Fed. Rep. of Germany | 74/761 |
| 2820891 | 11/1978 | Fed. Rep. of Germany | 74/688 |
| 777073 | 6/1957 | United Kingdom | 74/688 |

Primary Examiner—Leslie A. Braun
Assistant Examiner—Stephen B. Andrews
Attorney, Agent, or Firm—F. G. McKenzie; D. J. Harrington

[57] ABSTRACT

A powertrain includes a hydrokinetic torque converter driven from an electric motor that has an idle speed up to about half of its maximum speed. Three planetary gear sets, the first of these having two sets of planetary pinions mounted in a carrier for rotation, are located in the torque transmission path between the coupling and a differential. The transmission and motor are coaxial with the driveshaft of the vehicle. One-way brakes operate to fix elements of the gear sets against rotation to the transmission housing when torque is transmitted from the motor to the differential. Hydraulically actuated clutches and a brake band produce three forward speed ratios and a reverse drive ratio. The brake band and one clutch can be adapted to produce hill braking and regenerative braking during operation in the first two forward speed ratios.

12 Claims, 2 Drawing Figures

LOW & REV. $\left[\dfrac{1}{1-S_1/R_1}\right]\left(1+\dfrac{R_2}{S_2}\right)\left(1+\dfrac{S_3}{R_3}\right)$ 2ND $\left(1+\dfrac{R_2}{S_2}\right)\left(1+\dfrac{S_3}{R_3}\right)$ 3RD $\left(1+\dfrac{R_2}{S_2}\right)\left(1+\dfrac{S_3}{R_3}\right)-\dfrac{R_2}{S_2}$

SPLIT PATH ELECTRIC VEHICLE POWERTRAIN

BACKGROUND OF THE INVENTION

1. Field of the Invention

This invention pertains to a powertrain for use in a motor vehicle driven from a prime mover that has a high idle speed and a high maximum speed. More particularly, this invention pertains to the powertrain for such a motor vehicle that provides two paths for torque transmission through the torque converter to the various gearsets of the transmission.

2. Description of the Prior Art

Certain electrical motors that can be applied to drive a motor vehicle are d.c. motors having field weakening techniques to control the motor operation. Such motors are characterized by a base or idle speed that approximates one-half of the maximum speed of the motor. Consequently, transmissions operating in conjunction with these motors require some means for accommodating the high idle speed when the vehicle is driven from a standing start. The transmission must also be able to produce reverse drive with the motor turning in one direction only.

The operating range of a vehicle powered by an electrical motor is crucial to its commercial acceptance and success. Power losses particularly those associated with operation of the torque converter must be held as low as possible yet a hydrokinetic torque converter is required for start-up operation. The vehicle range can be extended if the transmission can accommodate regenerative braking, wherein the kinetic energy of the vehicle is recovered and converted to electrical energy to charge the batteries, the process acting to brake the vehicle.

The hydraulic control system that operates to actuate the clutches and brake bands of the transmission is a source of inefficiency that reduces the range of the vehicle. The transmission for an electrical vehicle should minimize the losses and preferably allow the vehicle to be operated in at leat one forward speed ratio with the hydraulic control system inoperative.

The vehicle in which an electric drive will be used will provide minimal space for the motor and transmission. Accordingly, the powertrain should be transversely mounted parallel to the wheel axles and preferably concentric with the axis of the drive wheels. The transmission should provide hill braking in at least one forward speed ratio wherein the motor can be used to brake the vehicle in cooperation with or independent of the wheel brakes. The kinetic energy can be recovered and used to charge the batteries when the vehicle is coasting.

SUMMARY OF THE INVENTION

A high speed d.c. motor, automatic transmission and final drive are integrated in a single transaxle system according to this invention. The electric motor is connected to the impeller of a torque converter and the turbine is driven from the impeller in the first forward speed ratio and during reverse drive. Alternatively, in the second and third forward speed ratios approximately half of the motor torque is transmitted from the impeller to the turbine and half is transmitted from the impeller directly to a first planetary gear set wherein the turbine and impeller torques are combined. Second and third simple planetary gear sets are driven from the first compound planetary gear set. The speed ratios are controlled by the application of hydraulically actuated clutches to produce acceptable torque ratios that are compatible with the high operational speed of the motor.

It is an object of this invention that the transmission produce a first forward speed ratio without the need for the application of hydraulic control pressure to the brakes that fix elements of the various gear sets against rotation. Instead, a one-way brake fixes the first sun gear against rotation during operation in the first forward speed ratio. Another one-way brake fixes the ring gear of the second gear set against rotation during operation in the first and second forward speed ratios. These brakes freewheel when the powertrain is operating in the third forward speed ratio and during reverse drive.

A first clutch operates to connect the impeller of the torque converter to the first sun gear during operation in the second and third forward speed ratios. In this way, a torque split path is produced and the inherent hydrodynamic losses associated with the torque converter are minimized because only a portion of the motor torque is transmitted through the torque coupling. When a 1-2 or a 2-3 gear shift is required, a second hydraulically actuated clutch connects the carrier of the third gear set to the ring gear of the second gear set during operation in the third forward speed ratio. A brake fixes the ring gear of the second gear set against rotation during operation in reverse drive ratio and, in a second embodiment in which the one-way brakes are deleted, during operation in the first and second forward speed ratios. A brake band is applied to fix the first sun gear against rotation during operation in the reverse drive ratio and, in the second embodiment wherein the one-way brakes are absent, during operation in the first forward speed ratio.

It is an object of this invention that the transmission accommodate regenerative braking. When the direction of torque transmission is from the third gear set toward the hydrokinetic coupling, a brake fixes the ring gear of the second gear set against rotation during operation in the second forward speed ratio. Similarly, regenerative braking occurs during operation in the first forward speed ratio, when torque transmission is in the direction from the third gear set toward the hydrokinetic coupling, when that brake is applied and another brake is applied to fix the first sun gear to the transmission housing.

DESCRIPTION OF THE PREFERRED EMBODIMENT

Figure 1:
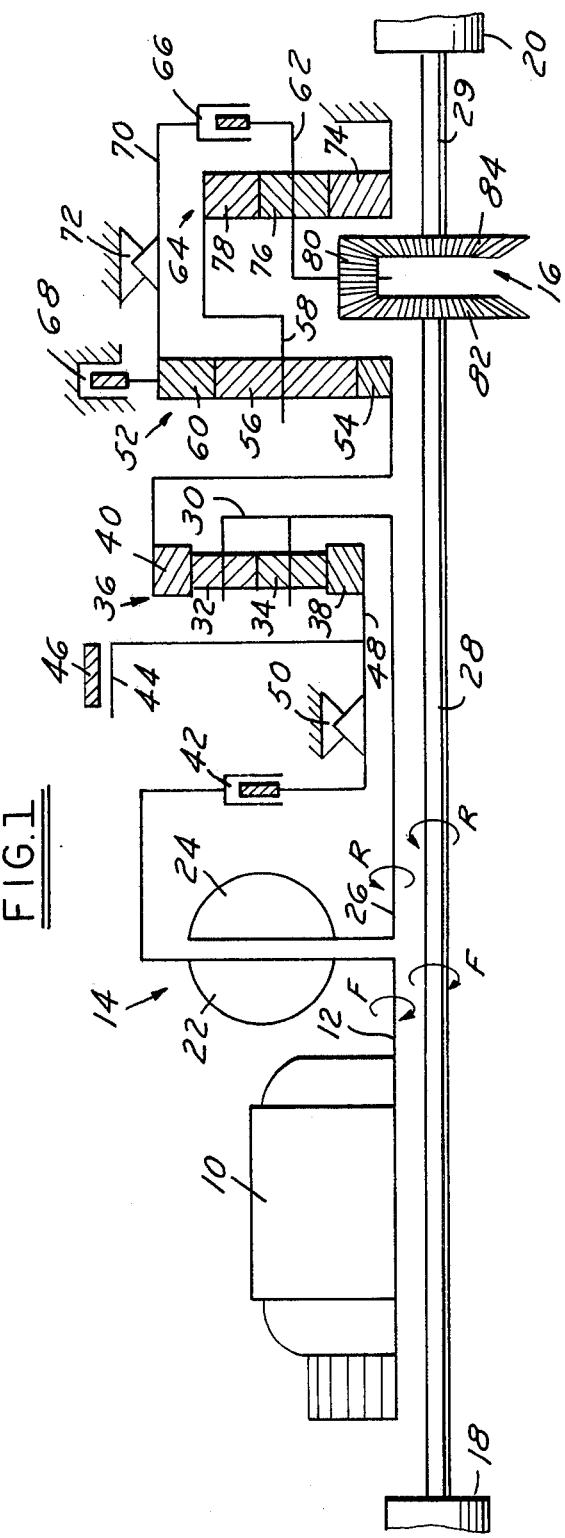
FIG. 1 is a schematic diagram of the powertrain according to this invention.

An electric motor 10 having a base or idle speed of approximately half its maximum rotational speed has its output shaft or driving member 12 connected to a hydrokinetic coupling 14. The planetary gear sets of the transmission drive a differential 16 that transmits power to the drivewheels of the vehicle through constant velocity joints 18, 20. When the powertrain is applied to a front wheel drive vehicle, the centerline of the wheel axles is the axis about which the motor, fluid coupling, gear sets, differential and constant velocity joints are concentric.

The fluid coupling includes a bladed impeller 22 and a bladed turbine 24 defining a toroidal fluid flow path therebetween that rotate within a housing (not shown). The turbine is driveably connected to a driven member 26, which is a sleeve shaft having a bore through which driveshaft 28 extends between constant velocity joint 18 and differential 16. The driven member 26 is connected to a carrier 30 upon which planet pinions 32 and 34 of a first compound planetary gear set are rotatably mounted. Gear set 36 includes a sun gear 38 in meshing engagement with the inner set of planet pinions 34. The outer set of planet pinions 32 is in meshing engagement with a ring gear 40 and with the inner pinion set.

The impeller 22 is connected to sun gear 38 through a selectively engageable friction disc clutch 42 which is engaged to produce second and third forward speed ratios. A brake drum 44 is surrounded by a brake band 46, which is adapted to be engaged during reverse drive, regenerative braking and hill braking in the first forward speed ratio. When brake band 46 is applied, the element 48 that connects clutch 42 to sun gear 38 is prevented from rotating. A one-way brake 50 has its inner or driving element mounted on the connecting shaft 48 and its driven element fixed against rotation to the transmission housing. Clutch 50 is adapted to produce a one-way driving connection between clutch 42 and sun gear 38 during operation in the first forward speed ratio and in the reverse drive ratio.

A second simple planetary gear set 52 includes a second sun gear 54 driveably connected to ring gear 40 and meshing with a set of planet pinions 56 that is rotatably mounted on a second carrier 58. A second ring gear 60 is driveably engaged with pinions 56 and is connected to the carrier 62 of a third gear set 64 through a selectively engaged friction disk clutch 66 that is actuated to produce the third forward speed ratio. Ring gear 60 can be fixed against rotation to the transmission housing by brake 68, which is a friction disk device. Brake 68 is actuated to produce reverse drive ratio, the hill braking function and regenerative braking in the first and second forward speed ratios. The member 70 that connects ring gear 60 to clutch 66 has the inner driving element of a one-way brake 72 mounted thereon. Brake 72 is adapted to produce a one-way driving connection between ring gear 60 and clutch 66, its outer or driven member being fixed to the transmission casing. Clutch 72 operates to fix member 70 against rotation in the first and second forward speed ratios and overruns during operation in the third forward speed ratio and in reverse drive.

The third gear set 64 includes a sun gear 74, which is permanently fixed against rotation to the transmission housing. Rotatably mounted on carrier 62 is a set of planetary pinions 76 in continuous meshing engagement with gear 74 and a ring gear 78. Carrier 62 is driveably conncted to bevel pinion 80 of the differential mechanism 16. Rotation of pinion 80 about axis A—A drives the bevel gears 82, 84 and the drive shafts 28, 29 to which they are joined.

Figure 2:
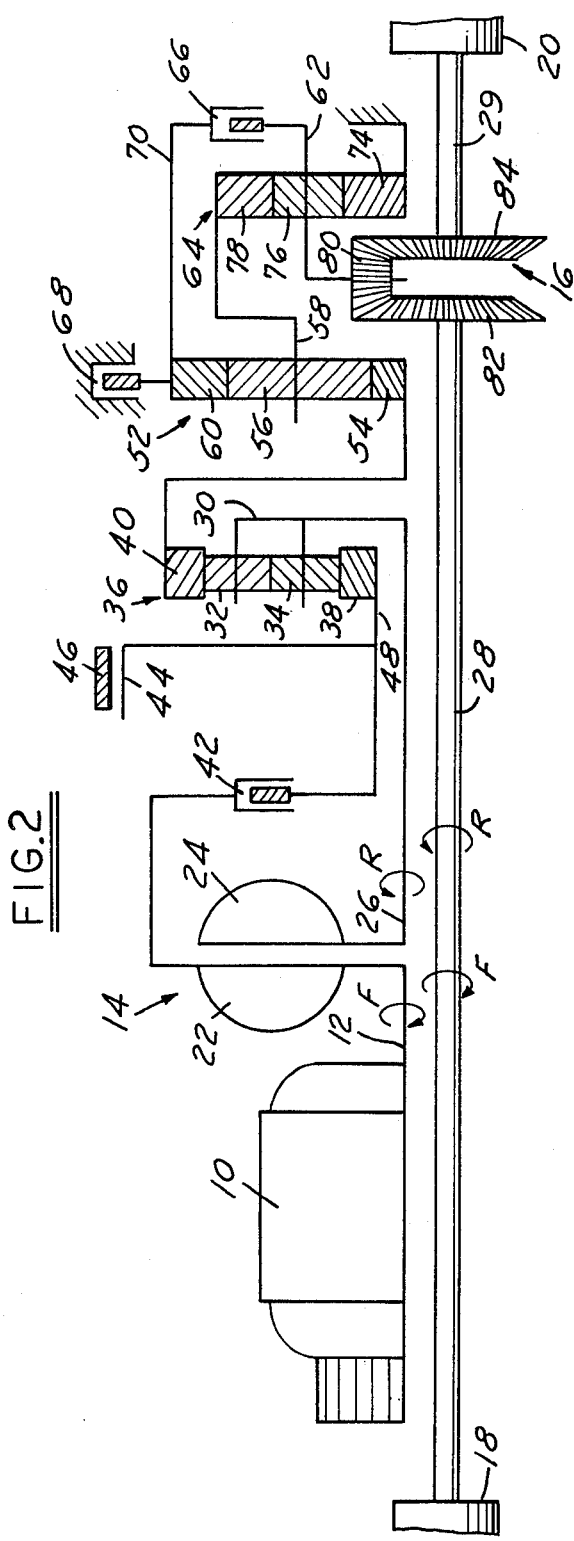
FIG. 2 is a schematic diagram identical to FIG. 1 but with the one-way brakes removed.

The powertrain shown in FIG. 2 is identical to that of FIG. 1 except that one-way brake 50 and 72 are absent and their function in the first forward speed ratio drive is produced by the application of brake band 46 and brake 68. The function of brake 72 in producing the second forward speed ratio is supplied by actuating brake 68. The powertrain of FIG. 2, therefore, requires that the hydraulic system that actuates brake band 46 and clutch 68 be operative in order that the first and second forward speed ratios may result. The powertrain of FIG. 1 will produce the first forward speed ratio without the need to actuate any of the clutches through operation of the pressurized hydraulic system.

During operation in the first forward speed ratio, the impeller driven by the motor transmits power to the turbine, which is applied by driving member 26 to the carrier 30. Sun gear 38 is held against rotation through operation of one-way brake 50 that fixes the sun gear to the transmission housing. Consequently, ring gear 40 is driven by planet pinions 32 and torque is transmitted to sun gear 54. Ring gear 60 is held through the operation of one-way brake 72 and the output of the second gear set is transmitted by carrier 58 to ring gear 78. Sun gear 74 is permanently fixed to the transmission housing and carrier 62 is then the driven member of the third gear set. Differential pinion 80 is driven by carrier 62 and power is transmitted to driveshafts 28 and 29 through operation of the differential. If it is assumed that the ratio of the diameter of ring gear 40 to sun gear 38 is 2.0, and the ratio of the diameters of ring gear 60 to sun gear 54 is 5.0 and the ratio of the diameters of the sun gear 74 to the ring gear 78 is 0.7, the torque ratio during operation in the lower speed ratio is 20.4:1.

Clutch 42 is applied to produce a ratio change to the second speed ratio. When this occurs, power from the motor is transmitted from the impeller partially to the turbine and partially through clutch 42 to sun gear 38. Brake 50 overruns when power is transmitted in this direction. Approximately half of the motor torque is applied to sun gear 38 through this path and half is directed through the turbine and applied by the driven member 26 to the carrier 30. The first gear set is then the torque splitting gear set wherein power from the impeller and turbine is combined to drive the ring gear 40 with no speed reduction occuring in the first gear set. Sun gear 54 is driven from ring gear 40 and ring gear 60 of the second gear set is fixed to the transmission housing through operation of one-way brake 72. Carrier 58, the driven member of the second gear set, drives ring gear 78. Sun gear 74 is fixed to the transmission casing, thus carrier 62 operates to drive bevel pinion 80, the bevel gears 82, 84 and driveshafts 29, 30. This produces an overall torque ratio of 10.2:1 if the sun gear and ring gear diameter ratios are the same as those previously described.

To produce a change from the second speed ratio to the third speed ratio, clutch 42 remains engaged and clutch 66 is applied. Approximately half of the motor torque is delivered from the impeller through clutch 42 to sun gear 38. The turbine applies half of the torque to carrier 30 and ring gear 40 is the driven element of the first gear set 36 wherein the torque splitting paths are combined without torque ratio change. Ring gear torque is applied directly to the sun gear 54 and carrier 58 drives ring gear 78 of the third gear set. Reaction torque on ring gear 60 is transferred through clutch 66 to carrier 62. Because sun gear 74 is fixed to the transmission casing, carrier 62 drives bevel gears 82, 84 through the bevel pinion 80. If the ratios of the ring gear diameters to the sun gear diameters are the same as those previously described, the overall torque ratio that is achieved in the transmission during operation of the third speed ratio is 1.95:1.

Reverse drive results when brake band 46 is applied and brake 68 is engaged provided the other hydraulic clutches 42, 66 are disengaged and the motor direction is reversed. In this case full motor torque is transmitted through the torque converter to the turbine and to carrier 30. Sun gear 38 is fixed against rotation to the transmission housing through operation of one-way brake 50 and ring gear torque is applied directly to sun gear 54. Brake 68 operates to fix ring gear 60 against rotation therefore carrier 58, the output member of the second gear set, drives ring gear 78. Sun gear 74 is the reaction element of the third gear set and carrier 62 drives bevel pinion 80.

In the powertrain shown in FIG. 2 one-way brakes 50 and 72 have been eliminated. Therefore, in the first forward speed ratio and during operation in reverse drive the function of brake 50 in locking sun gear 38 to the transmission housing is produced by applying brake band 46. Brake band 46 would not be applied in the second and third speed ratio operation. Similarly, during operation in the first and second forward speed ratios where brake 72 has been described as fixing ring gear 60 to the transmission casing, this function can be provided by actuating brake 68.

The hydraulic control system which applies pressurized fluid to actuate hydraulic clutches 42, 66 brake 68 and brake band 46 can be adapted to produce hill braking and regenerative braking. To produce hill braking while the transmission is operating in the second forward speed ratio, brake 68 is applied because one-way brake 72 will freewheel when drive is in the direction from the differential toward the motor. In the first forward speed ratio, brake 68 and brake band 46 must be applied in order to fix ring gear 60 and sun gear 38 to the transmission casing because one-way brake 72 and 50 freewheel when the direction of torque transmission through the powertrain is from the wheels of the vehicle toward the motor.

Having described a preferred form of my invention what I claim and desire to secure by U.S. Letters Patent is:

1. A multiple speed ratio power transmission having three forward speed ratios and a reverse drive ratio comprising:
   a compound planetary gearset having a first sun gear, a first ring gear, a first carrier, and first and second planet pinions journalled on the first carrier, the first planet pinions being in meshing engagement with the first sun gear and the second planet pinions, the second planet pinions being in meshing engagement with the first ring gear and the first planet pinions;
   second and third gearsets each having a sun gear, a ring gear, a carrier, and planet pinions journalled on the carrier in meshing engagment with the sun gear and ring gear;
   a driving member;
   a driven member connected to the carrier of the first gearset;
   hydrokinetic coupling means for driveably connecting the driving member to the driven member;
   first clutch means for connecting the driving member to the first sun gear during operation in the second and third forward speed ratios;
   second clutch means for connecting the carrier of the third gearset to the ring gear of the second gearset during operation in the third forward speed ratio;
   first brake means for fixing the first sun gear against ratation during operation in the first forward speed ratio;
   second brake means for fixing the ring gear of the second gearset against rotation during operation in the first and second forward speed ratios;
   third brake means for fixing the ring gear of the second gearset against rotation during operation in the reverse drive ratio; and
   fourth brake means for fixing the first sun gear against rotation during operation in the reverse drive ratio.

2. A multiple speed ratio power transmission having three forward speed ratios and a reverse drive ratio comprising:
   a compound planetary gearset having a first sun gear, a first ring gear, a first carrier, and first and second planet pinions journalled on the first carrier, the first planet pinions being in meshing engagement with the first sun gear and the second planet pinions, the second planet pinions being in meshing engagement with the first ring gear and the first planet pinions;
   second and third gearsets each having a sun gear, a ring gear, a carrier, and planet pinions journalled in the carrier in meshing engagement with the sun gear and ring gear;
   a driving member;
   a driven member connected to the carrier of the first gearset;
   hydrokinetic coupling means for driveably connecting the driving member to the driven member;
   first clutch means for connecting the driving member to the first sun gear during operation in the second and third forward speed ratios;
   second clutch means for connecting the carrier of the third gearset to the ring gear of the second gearset during operation in the third forward speed ratio;
   first brake means for fixing the first sun gear against rotation during operation in the first forward speed ratio and during operation in the reverse drive ratio; and
   second brake means for fixing the ring gear of the second gearset against rotation during operation in the first and second forward speed ratios and during operation in the reverse drive ratio.

3. The transmission of claim 1 wherein the first brake means include an overrunning coupling adapted to produce a one-way driving connection between the first sun gear and ground and wherein the second brake means include an overrunning coupling adapted to produce a one-way driving connection between the third ring gear and ground.

4. The transmission of claim 2 wherein the first brake means include an overrunning coupling adapted to produce a one-way driving connection between the first sun gear and ground and wherein the second brake means include an overrunning coupling adapted to produce a one-way driving connection between the third ring gear and ground.

5. The transmission of claim 1 further comprising a differential mechanism having an input element connected to the carrier of the third gearset and an output element driven by the input element.

6. The transmission of claim 2 further comprising a differential mechanism having an input element connected to the carrier of the third gearset and an output element driven by the input element.

7. The transmission of claim 1 wherein the third brake means fixes the ring gear of the second gearset against rotation during operation in the second forward speed ratio when the direction of torque transmission is from the third gearset toward the hydrokinetic coupling means.

8. The transmission of claim 1 wherein the third brake means fixes the ring of the second gearset against rotation and the fourth brake means fixes the first sun gear against rotation during operation in the first forward speed ratio when torque transmission is in the direction from the third gearset toward the hydrokinetic coupling means.

9. The transmission of claim 2 wherein the second brake means fixes the ring gear of the second gearset against rotation during operation in the second forward speed ratio when torque transmission is in the direction from the carrier of the third gearset toward the hydrokinetic coupling means.

10. The transmission of claim 2 wherein the first brake means fixes the first sun gear against rotation and the fourth clutch means fixes the ring gear of the second gearset against rotation during operation in the first forward speed ratio when torque transmission is in the direction from the carrier of the third gearset toward the hydrokinetic coupling means.

11. The transmission of claim 1 wherein the hydrokinetic coupling has a bladed impeller and a bladed turbine defining a toroidal fluid flow path therebetween, the impeller being driveably connected to the driving member, the turbine being driveably connected to the driven member and wherein a portion of the torque applied to the driving member is transmitted to the first sun gear from the impeller and a portion of the torque applied to the driving member is transmitted to the first carrier during operation in the second and third forward speed ratios.

12. The transmission of claim 2 wherein the hydrokinetic coupling has a bladed impeller and a bladed turbine defining a toroidal fluid flow path therebetween, the impeller being driveably connected to the driving member, the turbine being driveably connected to the driven member and wherein a portion of the torque applied to the driving member is transmitted to the first sun gear from the impeller and a portion of the torque applied to the driving member is transmitted to the first carrier during operation in the second and third forward speed ratios.

* * * * *